United States Patent
Plummer et al.

(10) Patent No.: US 9,547,798 B2
(45) Date of Patent: Jan. 17, 2017

(54) GAZE TRACKING FOR A VEHICLE OPERATOR

(71) Applicant: STATE FARM MUTUAL AUTOMOBILE INSURANCE COMPANY, Bloomington, IL (US)

(72) Inventors: Bryan Allen Plummer, Urbana, IL (US); Parker Andrew Brown, Mundelein, IL (US); Brian Mark Fields, Normal, IL (US); Steve Roberson, Normal, IL (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 0 days.

(21) Appl. No.: 14/282,437

(22) Filed: May 20, 2014

(65) Prior Publication Data
US 2015/0339527 A1    Nov. 26, 2015

(51) Int. Cl.
*G06K 9/00*    (2006.01)

(52) U.S. Cl.
CPC ....... *G06K 9/00845* (2013.01); *G06K 9/00597* (2013.01)

(58) Field of Classification Search
None
See application file for complete search history.

(56) References Cited

U.S. PATENT DOCUMENTS

| 6,130,617 | A | 10/2000 | Yeo |
| 7,620,214 | B2 | 11/2009 | Chen et al. |
| 8,090,157 | B2 | 1/2012 | Hamza et al. |
| 8,509,541 | B2 | 8/2013 | Tallamraju et al. |
| 8,666,125 | B2 | 3/2014 | Petrescu et al. |
| 8,836,777 | B2 * | 9/2014 | Mehra ............................. 348/78 |

(Continued)

FOREIGN PATENT DOCUMENTS

JP    H1091325 A   *   4/1998

OTHER PUBLICATIONS

KurzweilAI | Accelerating Intelligence.News, "Could Emotion Detectors Make Driving Safer?", http://www.kurzweilai.net/could-emotion-detectors-make-driving-safer, Mar. 17, 2014.*

(Continued)

*Primary Examiner* — James M Anderson, II
(74) *Attorney, Agent, or Firm* — Marshall, Gerstein & Borun LLP; Randall G. Rueth

(57) ABSTRACT

A gaze tracking system captures images of a vehicle operator's face using an image sensor device positioned within a vehicle. The gaze tracking system may be detect facial features from each image and track the position of facial features over time. The gaze tracking system may use the detected facial features to track the vehicle operator's head pose and gaze direction. The images may be captured and analyzed in near-real time. By tracking movement of the driver's head and eyes over time, the gaze analysis system may predict or estimate head position and/or gaze direction when one or more facial features are not detectable. The gaze tracking system may generate a report regarding the vehicle operator's gaze distribution. The report may be saved to memory and may be graphically displayed at a screen.

22 Claims, 9 Drawing Sheets

(56) References Cited

U.S. PATENT DOCUMENTS

| | | | |
|---|---|---|---|
| 2007/0089054 A1* | 4/2007 | Morimoto | B60Q 9/00 715/700 |
| 2010/0165093 A1* | 7/2010 | Sugio et al. | 348/78 |
| 2013/0006674 A1* | 1/2013 | Bowne et al. | 705/4 |
| 2013/0076883 A1* | 3/2013 | Madau et al. | 348/78 |
| 2013/0189649 A1* | 7/2013 | Mannino | 434/65 |
| 2013/0265227 A1* | 10/2013 | Julian | 345/157 |
| 2013/0325478 A1* | 12/2013 | Matsumoto et al. | 704/274 |
| 2014/0204193 A1* | 7/2014 | Zhang et al. | 348/78 |

OTHER PUBLICATIONS

Collins, Lecture 16: planar homograpies, Penn State, 36 pages.
Could emotion detectors make driving safer? Kurzweil Accelerating Intelligence, http://www.kurzweilai.net/could-emotion-detectors-make-driving-safer, 2014, 3 pages.
Eye, Wikipedia, the free encyclopedia, http://en.wikipedia.org/wiki/Eye, 2014, 14 pages.
Haar-feature object detection in C#, CodeProject, http://www.codeproject.com/Articles/441226/Haar-feature-Object-Detection-in-Csharp, 2012, 10 pages.
Volvo monitors driver attention to adjust active safety systems, Telematics News, http://telematicsnews.info/2014/03/18/volvo-monitors-driver-attention-to-adapt-active-safety-systems_m5181/, 2014, 2 pages.

\* cited by examiner

GAZE TRACKING FOR A VEHICLE OPERATOR

TECHNICAL FIELD

The present disclosure generally relates to a system and a method for tracking the gaze of a vehicle operator.

BACKGROUND

Vehicle operators (e.g., drivers) regularly make visual scans of their environment (both external and internal to the vehicle). These visual scans frequently occur with regard to objects on or near a road (e.g., to view road signs, pedestrians near the road, etc.) and with regard to objects in the cabin of the vehicle (e.g., to view console readings such as speed, to operate a radio or other in-dash devices, or to view/operate personal mobile devices). Failure to properly scan one's environment can result in a driver failing to observe obstacles or people near the vehicle. Poor scanning behavior not only increases a driver's risk of causing an accident, but decreases his or her odds of successfully taking evasive action in response to unsafe behavior of others. In some instances, a driver may not even realize he or she exhibits unsafe scanning behavior. For example, safer and more experienced drivers generally have a relatively long gaze and good peripheral awareness. In other words, such drivers typically scan a large percentage of important areas, enabling the drivers to react to potential risks far ahead of the vehicle as well as those near the vehicle. By contrast, inexperienced drivers often have short-distance focus that is centrally located. Such scanning behavior puts the driver at risk of failing to observe peripherally located risks, as well as those located at a distance in front of the vehicle.

SUMMARY

Features and advantages described in this summary and the following detailed description are not all-inclusive. Many additional features and advantages will be apparent to one of ordinary skill in the art in view of the drawings, specification, and claims of this patent. Additionally, other implementations may omit one or more (or all) of the features and advantages described in this summary.

A gaze tracking system may include an image sensor device positioned within a vehicle to capture images of a vehicle operator's head. The gaze tracking system may also include a gaze analysis system to analyze the captured images, detect facial features, and determine gaze direction. The gaze tracking system may track the position of facial features over time. Example facial features that may be detected and tracked include an eye, an eye pupil, an eye iris, a nose, a mouth, or some combination thereof. The gaze tracking system may determine the vehicle operator's head pose and/or gaze direction based on the positions of the detected facial features. The images may be captured and analyzed in near-real time. By tracking movement of the driver's head and/or facial features over time, the gaze analysis system may predict or estimate head position and/or gaze direction when one or more facial features are not detected. The gaze tracking system may generate a report regarding the vehicle operator's gaze distribution. The report may be saved to memory and may be graphically displayed at a screen. For example, a heat map may be displayed to show how much the operator gazes in the direction of particular areas.

In an embodiment, a gaze tracking system includes an image sensor device positioned on or within a vehicle such that the image sensor device may capture an image of an operator interface area in the vehicle. A gaze tracking system may further include one or more processors communicatively coupled to the image sensor device and one or more memory devices communicatively coupled to the one or more processors. The one or more memory devices may comprise instructions that when executed cause the one or more processors to (i) perform a calibration and (ii) perform gaze tracking.

Instructions to perform a calibration may include instructions that when executed cause the one or more processors to: transmit a signal to cause the image sensor device to capture a first image of an operator interface area in the vehicle, receive the first image from the image sensor device, detect three facial features (including two eye pupils) in the first image, identify a first triangle including vertices positioned according to locations of the three facial features in the first image, and associate the first triangle with a first gaze direction.

Instructions to perform gaze tracking may include instructions that, when executed, cause the one or more processors to: transmit a signal to cause an image sensor device to capture a second image of an operator interface area in the vehicle, receive the second image from the image sensor device, detect the three facial features in the second image, identify a second triangle including vertices positioned according to locations of the three facial features in the second image, determine a transformation from the first triangle to the second triangle, determine a second gaze direction based (at least in part) on the determined transformation from the first triangle to the second triangle, and store (as report data stored at the one or more memory devices) data representing the second gaze direction.

In an embodiment, a computer-implemented method for operating a gaze tracking system may comprise causing one or more processors of a gaze tracking system to perform a calibration, and causing one or more processors of the gaze tracking system to track a gaze. Causing one or more processors of a gaze tracking system to perform a calibration may include causing one or more processors to: receive a first image of an operator interface area within the vehicle, detect three facial features (including two eye pupils) in the first image, identify a first triangle including vertices positioned according to locations of the three facial features in the first image, and associate the first triangle with a first gaze direction.

Causing one or more processors of the gaze tracking system to perform gaze tracking may include causing one or more processors of the gaze tracking system to: receive a second image of the operator interface area within the vehicle, detect the three facial features in the second image, identify a second triangle including vertices positioned according to locations of the three facial features in the second image, determine a transformation from the first triangle to the second triangle, determine a second gaze direction based, at least in part, on the determined transformation from the first triangle to the second triangle, and store, as report data stored to one or more memory devices, data representing the second gaze direction.

DETAILED DESCRIPTION

Figure 1:
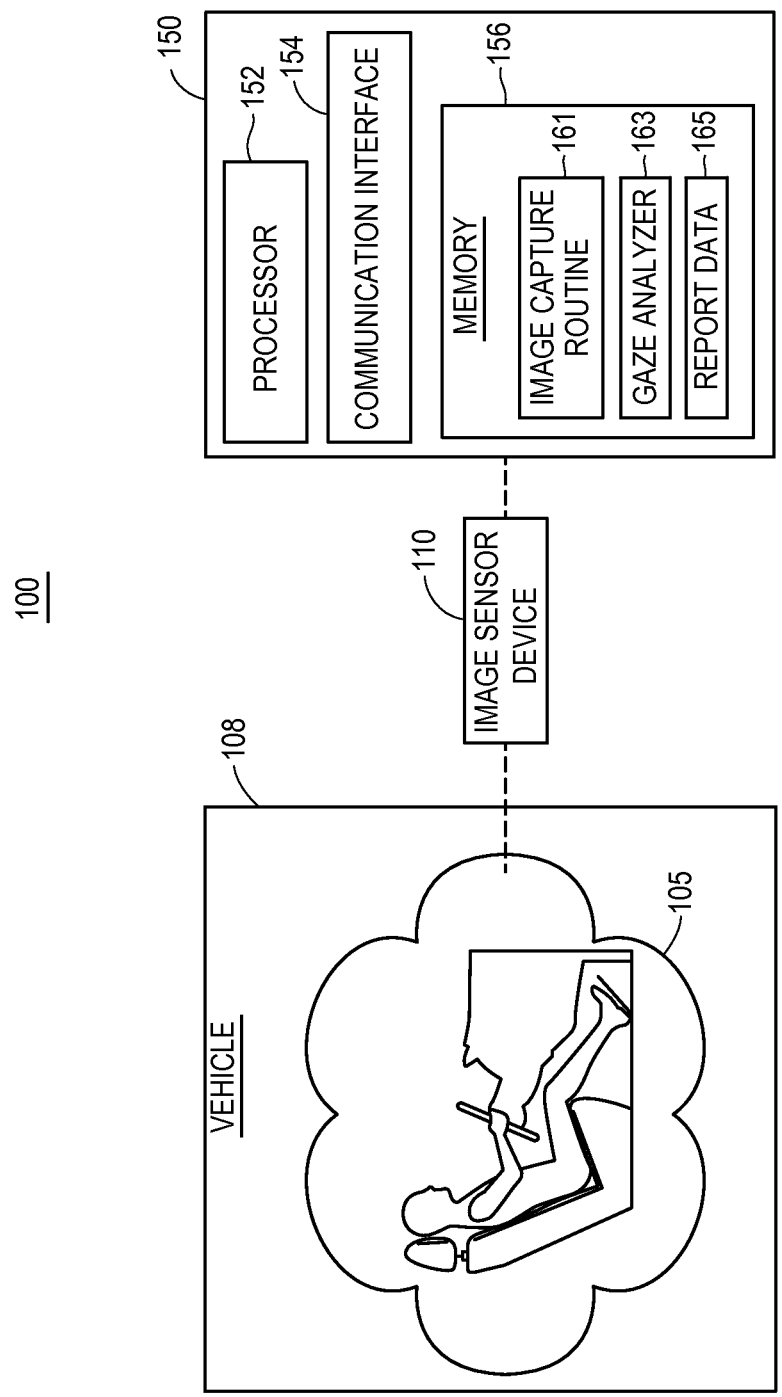
FIG. 1 illustrates a block diagram of an exemplary gaze tracking system according to an embodiment.
Figure 2A:
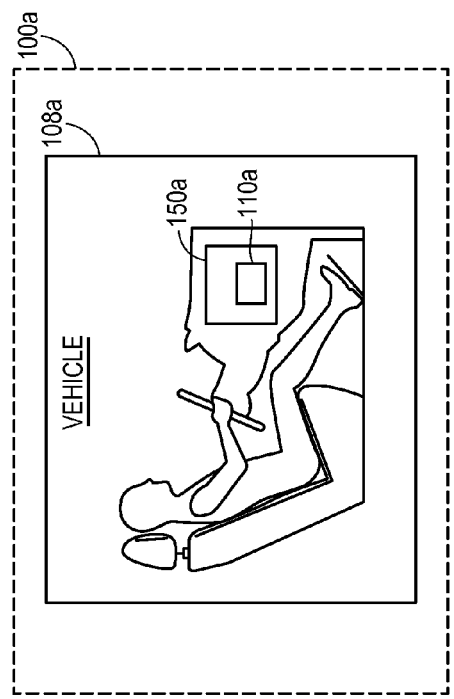
FIG. 2A-2D illustrate example gaze tracking systems according to the described embodiments.
Figure 2B:
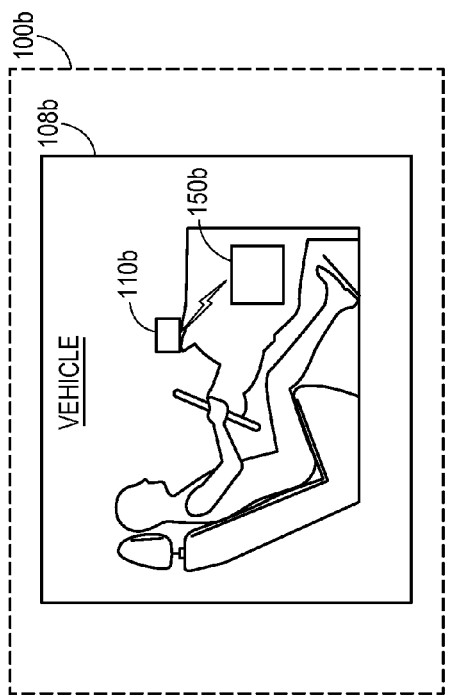
Figure 2C:
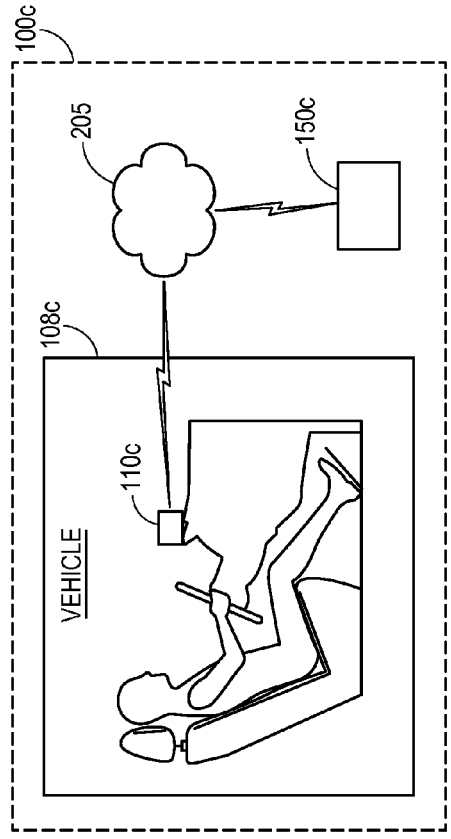
Figure 2D:
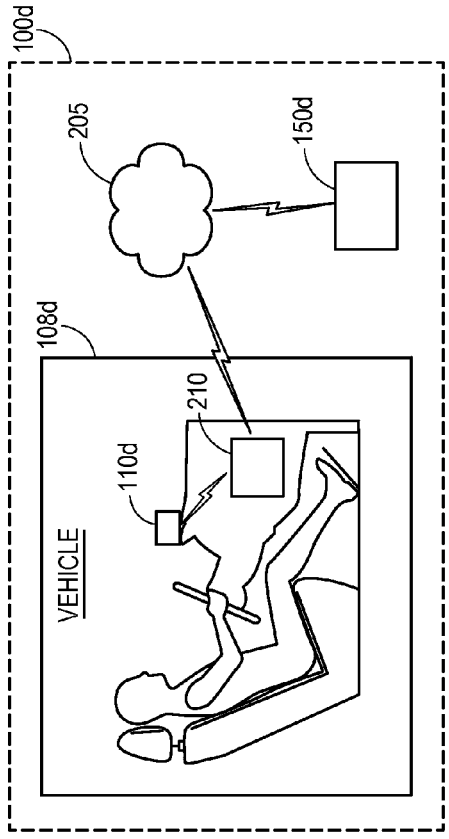

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to reference numerals included in the figures.

I. System Overview

FIG. 1 illustrates a block diagram of an exemplary gaze tracking system 100 according to an embodiment. The gaze tracking system 100 will be broadly described before addressing the vehicle 108, the image sensor 110, and the gaze analysis system 150.

I(a). Gaze Tracking System 100

The gaze tracking system 100 includes a vehicle 108, an image sensor device 110, and a gaze analysis system 150. The gaze tracking system 100 may be utilized to observe a vehicle operator's behavior during vehicle operation. In particular, the gaze tracking system 100 may observe and analyze the operator's scanning behavior to identify areas receiving too much operator focus, and/or areas receiving too little operator focus. Moreover, erratic or risky scanning patterns may be identified. In an embodiment, the operator's head pose may be tracked. In such an embodiment, it may be assumed that the operator's gaze tracks the operator's head position. Alternatively or additionally, the gaze tracking system 100 may detect and track the operator's pupils so that eye gaze direction may be tracked separately from head pose.

In operation of the gaze tracking system 100, the image sensor device 110 may capture an image or group of images (e.g., of an operator of the vehicle 108). The image sensor device 110 may transmit the image(s) to the gaze analysis system 150, where the gaze analysis system 150 detects facial features from the images and tracks (e.g., over time) the gaze of the operator.

The gaze tracking system 100 may be used to not only track an operators visual scanning behavior, but to provide feedback regarding the safeness or riskiness of the operator's scanning behavior. For example, the gaze analysis system 150 may generate a report regarding operator gaze. The report may indicate a distribution for areas of focus (determined from the tracked gaze) for an operator. The report may be used to evaluate an operator's skill. The report may also be used to generate feedback for the operator (e.g., to generate an alarm or indication when the operator's gaze or gaze distribution correlates to risky behavior). In one embodiment, the gaze tracking system 100 may detect and analyze images at a speed of at least 10 frames per second, enabling the gaze detection system 100 to reliably detect brief glances.

I(b). Vehicle 108

The vehicle 108 may be configured for travel by land, air, and/or water. For example, the vehicle 108 may be an automobile, a watercraft, or an aircraft. The vehicle 108 may be personal in nature (e.g., a car or general aviation aircraft owned for personal use). In some instances, the vehicle 108 may be a commercial vehicle, such as a train, truck, taxi, rental car, bus, passenger plane, or cargo plane used for business purposes. Regardless of form, the vehicle 108 generally includes a cockpit 105.

The cockpit 105 is an operator interface area where the operator may control the vehicle. Generally, the cockpit 105 includes a user interface. A vehicle user interface may include one or more user-input components, such as an ignition component, a steering component (e.g, a wheel or yoke), an accelerator component (e.g., a pedal or lever), a braking component, lighting switches, radio buttons or knobs, and/or a touch sensitive display (e.g., for interacting with a navigation system). The user interface may also include one or more output components or instruments to provide position and/or speed indicators, engine status indicators, alarm indicators, lighting indicators, and/or navigation displays. Generally the cockpit 105 includes a seat for the operator. The position of the seat may enable the operator to interact with one or more components of the user interface of the cockpit 105. The vehicle 108 may also include the image sensor 110.

I(c). Image Sensor Device 110

The image sensor device 110 is an optical instrument (e.g., a camera) configured to capture images. The image sensor device 110 may be mounted or otherwise positioned within the vehicle 108 and may be communicatively connected, directly or indirectly, to the gaze analysis system 150. The image sensor device 110 is generally configured to (i) capture an image or group of images of the cockpit 105, and (ii) transmit the image or group of images to the gaze analysis system 150.

Regarding build details, the image sensor device 110 may take any of a number of forms. For example, the image sensor device 110 may be a dedicated sensor or camera (e.g. a pinhole camera affixed to a dashboard or visor). In some instances, the image sensor device 110 may be an electronic device including circuitry for capturing or recording an image. For example, the image sensor device 110 may be a phone, tablet, or other portable electronic device including a camera. The image sensor device 110 may include any of a number of photosensors, photodiodes, photomultipliers, or image sensor types, including charge-coupled-devices (CCD), complementary metal-oxide-semiconductors (CMOS), or some combination thereof.

As for location, the image sensor device 110 may be positioned to capture an image of the cockpit 105. In particular, the image sensor device 110 may be positioned to capture an image of a vehicle operator's head or face. The image sensor device 110 may be positioned within the cabin of the vehicle 108 (e.g., near or within the cockpit 105) or outside the cabin of the vehicle 108 (e.g., a pinhole camera may be positioned outside of a windshield of the vehicle 108 and directed toward the cabin of the vehicle). The image sensor 110 may be unmounted or mounted (e.g., to a component of the vehicle 108). For example, a suction cup may mount the image sensor device 110 to a window or windshield of the vehicle 108, or to a panel of a dashboard in the cockpit 105. As another example, an apparatus (e.g., a mount including a clamp) may mount the image sensor device 110 to a steering wheel or to a vent within the vehicle 108. In some embodiments, the image sensor device 110 may be embedded in one or more components of the vehicle 108 (e.g., in a console, a monitor or display, a dashboard, a rearview minor, a dashboard etc.). In some instances the image sensor device 110 may be a single-camera setup, while in others the image sensor device 110 may be a multi-camera setup. For example, in some embodiments the vehicle 108 may include multiple image sensor devices 110 positioned throughout the vehicle 108, enabling the image sensor devices 110 to capture images of a vehicle operator from multiple positions and angles.

In operation, the image sensor 110 may capture an image of the cockpit 105 and transmit the image to a gaze analysis system 150. In some instances, the image may be transmitted to an on-board computer of the vehicle 108, where the on-board computer may receive the image and transmit the image to the gaze analysis system 150. Depending on the embodiment, the image sensor 110 may be controlled, in whole or in part, via a processor or microcontroller at the image sensor device, via the gaze analysis system 150, and/or via an on-board computer separate from the gaze analysis system 150. Control of the image sensor device 110 is described in more detail with reference to FIG. 2.

The image sensor 110 may be activated in any of a number of manners. For example, the image sensor 110 may be communicatively connected to a control system of the vehicle 108. In such an example, the image sensor 110 may receive a signal when the vehicle is turned on. In some embodiments, the image sensor 110 may be communicatively connected to a motion detection system, or may include a motion detection system. In an embodiment, the image sensor 110 may be activated after receiving a command signal from the gaze analysis system 150. In some embodiments, the image sensor 110 continually captures images. For example, the image sensor 110 may capture images at a rate of at least ten images per second.

I(d). The Gaze Analysis System 150

Generally speaking, the gaze analysis system 150 may take the form of a general purpose or special purpose computer system. For example, the gaze analysis system 150 may be a personal computer, server, laptop, tablet, a set-top box, a multiprocessor system, a microprocessor system, or any other type of computer. Further, the gaze analysis system 150 may be a distributed computing environment including multiple computing devices.

Regardless of form, the gaze analysis system 150 may include a processor 152, a communication interface 154, and a memory device 156. In an embodiment, the memory 156 includes machine readable media comprising instructions and/or data representing an image capture routine 161, a gaze analyzer routine 163, and/or report data 165. The gaze analysis system 150 may further include a system bus to communicatively couple the processor 152 to the communication interface 154 and the memory device 156.

The gaze tracking system 150 may be positioned on or within the vehicle 108. For example, the gaze tracking system 150 may be an on-board system integrated, e.g., with electronics for a control system or a console system (e.g., a navigation system, a radio, or a media player). As another example, the gaze tracking system 150 may be a portable electronic device, such as a phone or tablet. In some instances, the gaze tracking system 150 may be positioned at a remote location relative to the vehicle 108. For example, the gaze tracking system 150 may be a server. In any event, the gaze tracking system 150 may be communicatively connected to the image sensor device 110 (or to an intermediary device in communication with the image sensor device 110, such as an on-board computer).

In operation of an embodiment, the image capture routine 161, when executed, may cause the processor 152 to transmit to the image sensor device 110 a command to capture an image. In some embodiments, the image sensor device 110 or another system (such as an on-board computer system) may include the image capture routine 161 or a similar routine for capturing images. Regardless of how the image capture is initiated, the gaze analysis system 150 may receive, via the communication interface 154, an image captured by the image sensor device 110.

In further operation of an embodiment, a gaze analyzer routine 163 may cause the processor 152 of the gaze analysis system 150 to analyze the received image to detect facial features. The gaze analyzer routine 163 may include (or call) one or more object classifiers for facial feature detection.

An object classifier is a module or routine configured to categorize an image or area of an image. For example, the gaze analyzer routine 163 may include an object classifier configured to categorize a scanned area of an image as (i) a nose; or (ii) not a nose. In some instances, the gaze analyzer routine 163 may include an object classifier configured to categorize a scanned area with reference to other facial or head features, such as an eye, mouth, chin, forehead, ear, cheek, hairline, jaw, etc. In one embodiment, the gaze analyzer routine 163 includes an object classifier that utilizes reference patterns (also referred to as "image features") for facial feature detection. Each of these reference patterns typically corresponds to a visual feature of a facial feature (e.g., an eye or nose) that the classifier is configured to detect. For example, a reference pattern may correspond to a shape or lighting pattern typically found in images of the desired facial feature. Classifiers and reference patterns that may be utilized by the gaze analysis system 150 are described in more detail with reference to FIG. 7A-7C and FIG. 8.

In some instances, the gaze analysis system 150 may detect eyes from an image. The gaze analysis system may rely on the eye center to determine gaze direction. In short, the operator may be assumed to be gazing forward relative to the orientation of his or her head. In some embodiments, the gaze analysis system 150 provides more precise gaze tracking by detecting pupil or iris positions. Pupil and/or iris tracking enables the gaze analysis system 150 to detect gaze direction distinct from head pose. Drivers regularly make visual scans with little or no head movement, glancing to the left or right (or up or down), for example, to better see items or objects outside of their direct line of sight. These visual scans frequently occur with regard to objects on or near the road (e.g., to view road signs, pedestrians near the road, etc.) and with regard to objects in the cabin of the vehicle (e.g., to view console readings such as speed, to operate a radio or other in-dash devices, or to view/operate personal mobile devices). In some instances, a driver may glance at some or all of these objects (e.g., out of the corner of his or her eye) with minimal head movement. By tracking the pupils and/or iris, the gaze analysis system may detect upward, downward, and sideways glances that would otherwise go undetected in a system that simply tracks head position.

Based on the detected facial features, the gaze analyzer 163 may further cause the processor 152 to determine a gaze direction (e.g., for a gaze of an operator at the vehicle 108). In some embodiments, the communication interface 154 of the gaze analysis system 150 receives a series of images (and/or video). The processor 152 of the gaze analysis system 150 may detect facial features in multiple images (e.g., a series or sequence of images). Accordingly, the gaze analysis system 150 may track gaze direction over time.

To return, the memory 156 may include report data 165 in an embodiment. The report data 165 may represent a report (e.g., regarding gaze distribution) generated by the gaze analysis system 150. For example, a file including gaze distribution statistics (e.g., for time spent gazing straight ahead, gazing to the left, gazing down, etc.) may be saved to the memory 156. In some instances, some or all of the report data 165 (and/or graphics generated from the report data) may be displayed via a screen (not shown in FIG. 1). For example, the gaze tracking system 100 may display a report via a screen (not shown) of the gaze analysis system 150, the image sensor device 110, or another portable electronic device. The gaze tracking system 100 may also display the report via a screen of an on-board computer (e.g., at a console or dashboard).

In some instances the gaze analyzer 163, or a classifier utilized by the gaze analyzer 163, may be trained. Training the gaze analyzer 163 may include scanning a set of images containing desired features (e.g., eyes and/or nose) and/or images containing no desired features. Performance of the gaze analyzer 163 may be analyzed to identify a hit/miss rate, to identify false positives, etc. Thresholds utilized by the gaze analyzer 163 may be set or adjusted during training. Training may be implemented by a training routine (not shown) stored at the memory 156.

In an embodiment, the gaze tracking system 100 may be calibrated. For example, the image sensor device 110 may capture an image of the operator's face and/or eye(s). Calibration may entail adjusting the image sensor device 110 to account for skin tone, facial characteristics, etc., ambient light in the vehicle, the background behind the operator, etc. Calibration may further entail capturing a reference image (or group of images) of the operator gazing forward with a neutral head pose. Analysis of subsequent images may comprise comparing data from the subsequent images to data from the reference image(s). For example, a reference gaze direction may be associated with the reference image. In an embodiment, a gaze direction for a subsequent image may be determined, in part, based on a comparison of (i) locations of facial features detected in the subsequent image, and (ii) locations of the facial features detected in the reference image. In some instances, the gaze tracking system 100 may identify locations of facial features from a group or series of reference images. For example, the facial feature locations used as a reference for later comparison ("reference locations"), may represent average facial feature locations detected from a group of reference images. The reference locations may also be a range of locations. For example, facial feature locations determined from subsequently captured images may be compared to a reference range of locations, where the reference ragne defines a zone in which the operators facial features may be detected and classified as a forward gaze.

Calibration may be automatic or manual. For instance, in some embodiments the gaze tracking system 100 may provide an indicator (not shown) to a vehicle operator. The indicator may indicate to the operator that she should direct her gaze as expected during normal vehicle operation. For example, for a car the indicator may indicate to the operator that she should gaze forward (and/or with relatively neutral head pose) as if watching the road. As another example, for an airplane the indicator may indicate to the operator that she should direct her gaze to an instrument panel.

As an example of manual calibration, in some instances the gaze tracking system 100 may provide instructions via a speaker (not shown) or a display (not shown) regarding the operator's head pose and/or gaze for calibration. As an example of automatic calibration, the gaze tracking system 100 may detect the operator's facial features during a particular period of time while the operator is operating the vehicle. The gaze tracking system 100 may identify a distribution of facial feature positions detected from multiple images and estimate a forward-gaze and/or head pose by analyzing the distribution. For example, when the image sensor device 110 is positioned in front of the driver, the distance between the operator's eyes (from the perspective of the image sensor device 110) may be greatest when the operator is gazing forward. When the operator turns her head, the distance between the operator's eyes (from the perspective of image sensor device 110) likely decreases relative to a forward gaze head pose.

In an embodiment, the gaze analyzer 163 may enable the gaze analysis system 150 to estimate or predict positions for facial features not actually detected. Because the gaze analysis system 150 may function essentially in real-time, the gaze analysis system 150 may identify small changes in orientation and/or position of an operator. Accordingly, the gaze analysis system 150 may identify movement patterns across a time-sequenced set of images. Thus, in some instances the gaze analysis system 150 may identify a trend or attribute for the movement. For example, the gaze analysis system 150 may determine an operator is rotating his or her head left at a steady speed or at a particular rate of acceleration. When one or more of the tracked facial features is occluded for an image, the gaze analysis system may predict that the occluded feature is located at a position consistent with (i) the determined rotation speed (and/or rate of acceleration) and (ii) a time lapse between a time of capture for the most recent image including the feature and a time of capture for the image where the feature is occluded. In some instances, the gaze analysis system 150 may estimate or predict a position for an occluded or otherwise undetected feature based, at least in part, on the location of one or more other detected facial features, and the spatial relationship between those other detected facial features. For example, the distance between a detected nose and a detected eye may shrink or grow as an operator tilts his or her head up or down. Accordingly, the gaze analysis system 150 may rely on distances between detected facial features when estimating head pose.

In some instances, a homography may be utilized to estimate head pose and/or gaze direction. A homography is a transformation from one projective plane to another. In an embodiment, a homography can be computed for a pair of images where a particular feature or group of features (e.g., facial features) can be identified in both images.

In one embodiment, the gaze tracking system 100 may utilize an affine transformation to estimate head pose and/or gaze direction. An affine transformation preserves collinearity (i.e., all points lying on a line remain on a line after the transformation) and ratios of distances (e.g., a midpoint of a line segment remains the midpoint after transformation). On the other hand, an affine transformation does not necessarily preserve angles or lengths. Because the distance between a person's pupils generally remains constant, an affine transformation may be utilized to determine a gaze direction that accounts for pupil position.

The gaze tracking system 100 may detect and track a fourth feature in some instances. For example, an operator's mouth may be detected and tracked.

In an embodiment, a determination is made regarding the orientation of the head (i.e., head pose). When the head is determined to be oriented forward (i.e., exhibiting little rotation around a vertical axis), eye pupils and/or irises may be detected and tracked to determine eye gaze direction independent of the orientation of the head. In some instances, the gaze tracking system 100 may determine whether an operator's head is turned or rotated. The gaze tracking system 100 may determine gaze direction consistent with head orientation in such instances (e.g., the operator may be assumed to be gazing straight ahead relative to the orientation of his face). Such an assumption may be especially useful when head orientation and/or position precludes detection of eye pupils or irises. In some embodiments, pupil or iris detection may be used to track eye gaze direction even when the head is rotated or tilted II. Example Embodiments of Gaze Tracking Systems FIG. 2A-2D illustrate example gaze tracking systems 100a-100d according to the described embodiments.

II(a). Gaze Tracking System 100a

The gaze tracking system 100a includes a vehicle 108a, which includes a gaze analysis system 150a. The gaze analysis system 150a includes an image sensor device 110a. The image sensor device 110a may communicate with one or more components of the gaze analysis system 150a via a communication bus of the gaze analysis system 150a.

The gaze analysis system 150a may be a dedicated device or a general purpose device (e.g., a tablet, phone, or other personal electronic device). The gaze analysis system 150a may be affixed, mounted, or otherwise positioned within the vehicle 108a. For example, the gaze analysis system 150a may be positioned on a dashboard of the vehicle 108a.

The image capture device 110a may be an embedded camera sharing a housing with other components of the gaze analysis system 150a. Accordingly, the image capture device 110a may have a very small form factor, sometimes having a footprint smaller than 2 mm×2 mm.

In operation of the gaze tracking system 100a, a processor of the gaze analysis system 150a may cause the image sensor device 110a to capture an image or group of images (e.g., by transmitting a signal via a communication bus to the image capture device 110a). A processor of the gaze analysis system 150a may cause the image to be stored at a memory device communicatively connected to the processor. A processor of the gaze analysis system 150a may execute a routine to analyze the image(s), enabling gaze analysis system 150a to detect facial features, track eye gaze, and/or generate a report regarding eye gaze.

In an embodiment, an image is captured in response to input received from a user interacting with the gaze tracking system 150a (e.g., via a touch display or a mechanical actuator).

II(b). Gaze Tracking System 100b

The gaze tracking system 100b includes a vehicle 108b, which includes an image sensor device 110b and a gaze analysis system 150b. The image sensor device 110b and the gaze analysis system 105b may be communicatively connected for wired or wireless communication. The image sensor device 110b and the gaze analysis system 105b may each include a communication interface for wired or RF communication according to various protocols or standards (e.g., 802.11, TCP/IP, Bluetooth protocols, NFC protocols, etc). For example, the image sensor device 110b and gaze analysis system 105 may communicate via one or more radio bands within the industrial, scientific and medical (ISM) radio bands (e.g., 900 MHz, 2.4 GHz, 5.6 GHz, 24 GHz, and/or 60 GHz). These radio bands may include bands typically used for personal area network communication, local area network communication, or near field communication.

In an embodiment, one or more components of the gaze analysis system 150b may be located in the cabin of the vehicle 108b or a compartment of the vehicle 108b (e.g., a trunk, an engine compartment, a glove box, etc.). The gaze analysis system 150b may be a dedicated device, or may be integrated into other electronic systems of the vehicle 108b. In operation, the image sensor device 110 captures an image or group of images and transmits the image(s) to the gaze analysis system 150b.

II(c). Gaze Tracking System 100c

The gaze tracking system 100c includes a vehicle 108c, a gaze analysis system 150c, and a network 205. The vehicle 108c includes an image sensor device 110c.

Generally speaking, the network 205 may be any collection of nodes (e.g., devices or systems, such as the gaze analysis system 150c and image sensor device 110c, capable of sending, receiving and/or forwarding information) and links which are connected to enable communication between one or more of the nodes. The network 205 may establish a logical link between the image sensor device 110c and the gaze analysis system 150c, and may include any combination of physical links and/or intermediary nodes (e.g., routers, switches, or other networking equipment). The network 205 may include one or more packet-switched networks and/or circuit-switched networks.

The image sensor device 110c and the gaze analysis system 105c may each include a communication interface for RF communication according to various protocols or standards (e.g., 802.11, TCP/IP, GSM, EDGE, LTE, 3G, 4G, Bluetooth protocols, NFC protocols, etc), enabling the image sensor device 110c and the gaze analysis system 105c to communicate via the network 205. In an embodiment, the image sensor device 110c may transmit image(s) to the gaze analysis system 150c via the network 205. For example, the image sensor device 110c may utilize a mobile data service to transmit the image(s) via cellular data network included in the network 205. In such an example, the image sensor device 110c and gaze analysis system 150c may communicate despite being geographically distant from each other. In one embodiment, the image sensor device 110c and gaze analysis system 105c may communicate via a short range network included in the network 205 (e.g., a local area network or personal area network). For example, the gaze analysis system 105c may be positioned at a particular location (e.g., a "home base" or other station). The image sensor device 110c may wirelessly transmit images to the gaze analysis system 105c when in range (e.g., when the vehicle 108 drives within range of a transceiver associated with the gaze analysis system 105c).

II(d). Gaze Tracking System 100d

The gaze tracking system 100d includes a vehicle 108d, a gaze analysis system 150d, and a network 205. The vehicle 108d includes an image sensor device 110d and an on-board computer 210.

In an embodiment, the image sensor device 110d may be controlled via the on-board computer 210. In such an embodiment, the on-board computer 210 may cause the image sensor device 110 to capture an image or images. In some embodiments, the image sensor device 110d is not controlled via the on-board computer 210. For example, the image sensor device 110d may automatically capture images, or capture images based on user input. Regardless of method of capture, the image sensor 110d may transmit an image or images to the on-board computer 210. The on-board computer 210 may then transmit the image(s) to the gaze analysis system 150d (via the network 205, as previously described with reference to the gaze tracking system 100c) for gaze tracking and reporting.

III. Example Methods and Images

Figure 3:
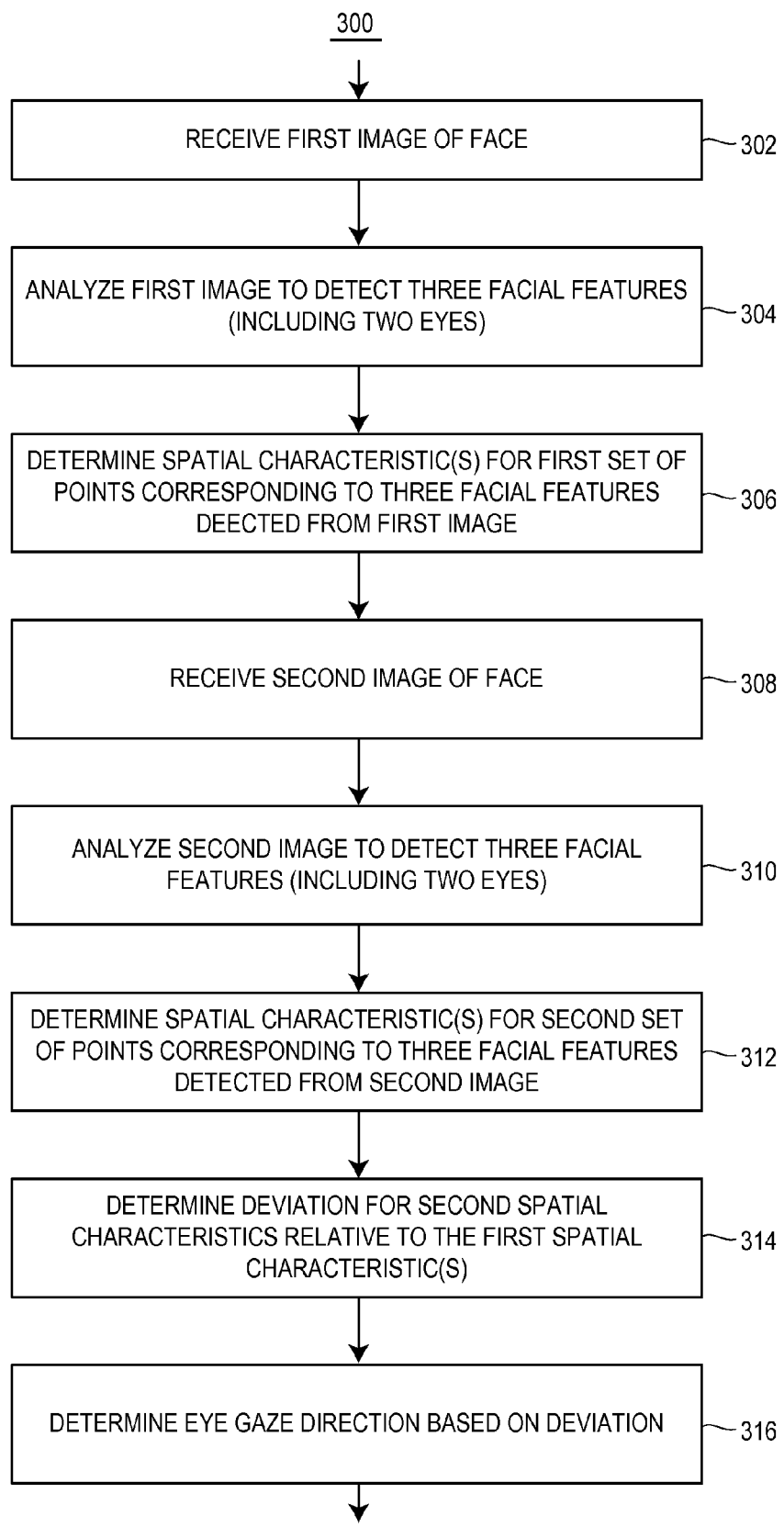
FIG. 3 illustrates an example method for gaze tracking in accordance with the described embodiments.

FIG. 3 illustrates an example method 300 for gaze tracking in accordance with the described embodiments. The method 300 may be implemented, in whole or in part, on one or more devices or systems such as the gaze analysis system 150 of the gaze tracking system 100 shown in FIG. 1. The method 300 may be saved as a set of instructions, routines, programs, or modules at a computer readable medium. In particular, the method 300 may be saved as at least part of the gaze analyzer routine 163 shown in FIG. 1.

The method 300 begins when the gaze analysis system 150 receives a first image of a face (block 302). The first image may be captured by the image sensor device 110, and may be an image of an operator interface area for the vehicle 108. For example, the image sensor 110 may be directed to an area above a driver's seat in an automobile or a pilot's seat in an aircraft to capture an image of the vehicle operator's face and/or head.

The first image may be a "reference image" where an operator is looking straight-ahead with minimal head tilt or rotation. The reference image may be used to calibrate the gaze tracking system 100. For example, the gaze tracking system 100 may be calibrated by instructing the operator to sit in the operator interface area of the vehicle 108 as he or she does when operating the vehicle 108. The operator may be instructed to face forward and gaze forward. In some embodiments, the operator may be instructed to look at a road in front of the vehicle 108. The gaze tracking system 100 may associate a forward-looking gaze direction (e.g., a "reference gaze direction") with the reference image, enabling the gaze tracking system 100 to compare subsequently captured images to the reference image and determine a gaze direction relative to the reference gaze direction.

The gaze analysis system 150 may detect three facial features (including two eyes) from the first image (block 304). The gaze analysis system 150 may identify a first set of three points representing positions of the detected features. In an embodiment, the third detected facial feature is a nose. The gaze analysis system 150 may detect facial features utilizing any of a number of image processing or image segmentation techniques (e.g., thresholding, clustering, compression, histogram, edge detection, region-growing, and/or split-and-merge techniques). For example, the gaze analysis system 150 may utilize an object classifier configured to detect visual features associated with a desired facial feature. In some embodiments, a cascade classifier may be utilized. A cascade classifier is essentially a group of classifiers used in sequence. A cascade classifier may be useful for reducing false positives. For example, a positive result from a first classifier may result in a second classifier analyzing the image to "verify" the positive result. Depending on the embodiment, a negative result from a first classifier may result in either a non-detection or an analysis by a second classifier to "verify" the non-detection. In some instances, a Haar classifier or Haar cascade (sometimes referred to as a Viola-Jones system) may be utilized.

Comparing shading or intensity of various image areas can be useful for detecting facial features. As an example, each pixel of a grayscale image has a grayscale value. A pixel in an 8-bit grayscale image may have 256 different intensity levels (e.g., black being the weakest at 0, white being the strongest at 255). Accordingly, grayscale values of pixels may be identified when identifying contrast patterns. For example, because eye whites typically contrast with surrounding areas of the eye and face, eyes may be detected by identifying a high contrast region having a border consistent with an elliptical shape. In an embodiment, eyes may be detected and the operator may be assumed to be looking straight ahead relative to the orientation of his or her head. In some instances (as described in more detail with reference to FIG. 4), the gaze detection system 150 may detect pupils and/or irises.

The gaze analysis system 150 may determine one or more spatial characteristics associated with a first set of points representing positions of the detected feature (block 306). For example, the gaze analysis system 150 may determine spatial characteristics associated with a shape (e.g., a triangle) formed by the first set of points. In an embodiment, the gaze analysis system 150 may identify coordinate points for each of the three points in the first set. A coordinate system may be calibrated based on one or more reference objects typically located within the field of view of the image sensor 110. In any event, the gaze analysis system 150 may detect positions for each of the points.

With further reference to block 306, the gaze analysis system 150 may determine distances between pairs of the points in the first set, as well as angles formed at each point by lines extending from each of the other two points. In an embodiment, the three points in the first set may be connected to form a first triangle. In some embodiments (e.g., when the first image is a reference image), the first set of points may be referred to as a "reference set of points" or "reference positions;" the spatial characteristics of the first set may be referred to as "reference characteristics;" and the first triangle may be referred to as a "reference triangle."

The gaze analysis system 150 may receive one or more second images of a face (block 308) and detect three facial features (including two eyes) from the second image(s) (block 310). One or more of the detected facial features of the second image are the same facial features detected from the first image.

The gaze analysis system 150 may identify one or more spatial characteristics for a set of points corresponding to positions of the facial features detected in the second image (block 312). For example, the gaze analysis system may determine positions (e.g., coordinate positions) for each of the points, as well as distances and angles for lines extending between the points. In an embodiment, the gaze analysis system 150 may determine spatial characteristics associated with a shape (e.g., a triangle) formed by the second set of points.

The gaze analysis system 150 may compare the spatial characteristics associated with the first set of points to the spatial characteristics associated with the second set of points to determine (i) whether the second set of points deviate from the first, (ii) an extent to which the second set of points deviate from the first, and/or (iii) the nature of a deviation between the sets of points (block 314). In an embodiment, the gaze analysis system 150 compares a first shape (e.g., a first triangle) formed by lines connecting the first set of points to a second shape (e.g., a second triangle) formed by lines connecting the second set of points. Because a person's facial features are constant (i.e., the real-world distance between a person's eyes does not change), a change (as detected from captured images) in the spatial relationship between detected facial features may be used to determine a 3-dimensional transformation. In other words, when the distance between particular detected facial features changes, the change can be attributed to the operator moving his or her head. As an example, when the image sensor device 110 is positioned in front of a driver, the vertical distance between the nose and eyes shrinks as an operator tilts his head up or down. Similarly, the distance between an operator's eyes (from the perspective of images sensor device 110) shrinks as a driver turns his head left or right. The distance between features may also increase or decrease as the driver moves his head forward or backward relative to the image sensor device 110.

As a further example, the gaze analysis system 150 may identify, from a reference image of an operator gazing forward with minimal head tilt or rotation, a first set of three points corresponding to positions for the operator's eyes and nose. The three points may form a first triangle when connected. The gaze analysis system 150 may analyze a subsequent image and identify a second set of points corresponding to the operator's eyes and nose. The three points of the second set may form a second triangle. The gaze analysis system 150 may determine the second triangle is a deformation of the first triangle. For example, the gaze analysis system 150 may determine that the second triangle represents a rotated, reflected, and/or translated version of the first triangle (e.g., in 3-dimensional space). The gaze analysis system 150 may determine a difference in distance between points in the first set and points in the second set. The gaze analysis system 150 may determine that angles of the second triangle have changed relative to the first triangle. As a further example, the gaze analysis system 150 may determine that the deformation of the second triangle is indicative of a rotation along an x-axis, y-axis, and/or z-axis.

The gaze analysis system 150 may determine an eye gaze direction based on an identified deviation between the first set of points and the second set of points (block 316). The gaze analysis system 150 may determine that, relative to the reference image, a shorter vertical distance between the nose and eyes indicates that the operator is looking down or looking up, and/or that the operator's head is tilted down or tilted up. Similarly, shorter distances and/or changes in angles between facial features may indicate head tilt or rotation. In an embodiment, the gaze analysis system 150 identifies a plane including the three identified points. The gaze analysis system 150 may then identify the surface normal (i.e., a line perpendicular to the plane) that corresponds to a gaze direction. For example, with reference to the previously discussed second triangle, the gaze analysis system 150 may, after determining the second triangle represents a transformation of the first triangle, identify a surface normal for the second triangle. Because the nose and eyes are on a roughly similar plane, for example, a straight-ahead gaze is generally consistent with a line perpendicular to this plane. As the operator's head moves, the plane including the eyes and nose (and surface normal for the plane) moves. Thus, a gaze can be estimated as the operator's head moves. In some embodiments, the method 300 may include additional functionality (e.g., before or after block 316).

Figure 4A:
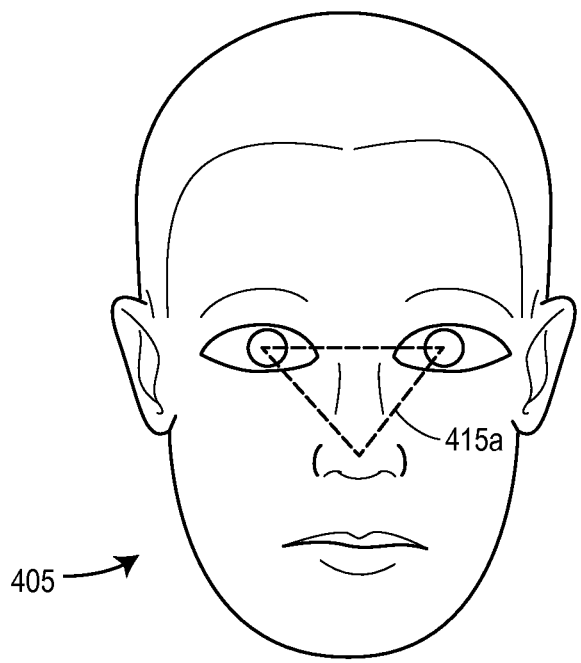
FIG. 4A-4C illustrate example images of a face of an operator that may be analyzed by the gaze analysis system according to an embodiment.
Figure 4B:
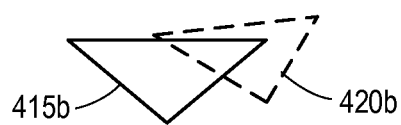
Figure 4C:
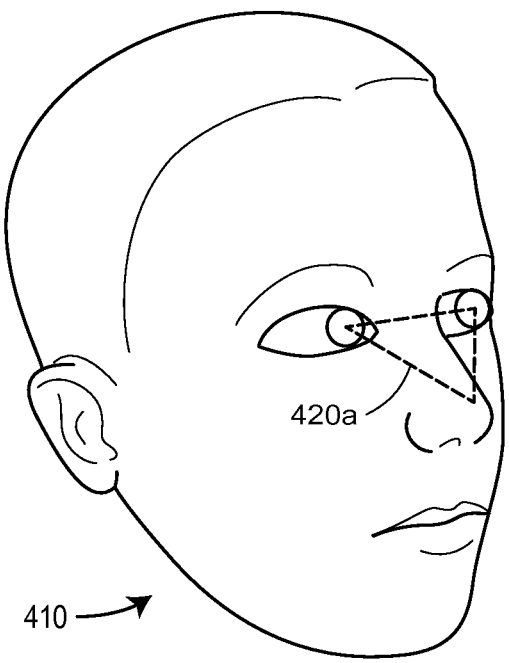

FIG. 4A-4C illustrate example images 405 and 410 of a face of an operator that may be analyzed by the gaze analysis system 150 (shown in FIG. 1) according to an embodiment. The image 405 depicts a face looking straight ahead, while the image 410 depicts a face rotated to the left (from the operator's perspective).

The image 405 includes a triangle 415a illustrating the spatial relationship between points corresponding to positions of facial features (e.g., eyes and nose) detected from image 405. Similarly, the image 410 includes a triangle 420a illustrating a spatial relationship between points corresponding to facial features (e.g., eyes and nose) detected from image 410.

Triangle 420b (corresponding to triangle 420a) is superimposed on a footprint 415b (corresponding to triangle 415a) to demonstrate the relationship between triangle 415a and triangle 420a. The triangle 420a represents a deformation relative to triangle 415a caused by head rotation. In particular, relative to image 405, image 410 illustrates a shorter distance between each of the detected features. Moreover, the angles at vertices of triangle 420b have changed relative to the angles at vertices of triangle 415a. When tracking facial features for an operator of a vehicle, the gaze analysis system 150 may detect such deformations to determine a gaze direction for the operator.

Figure 5:
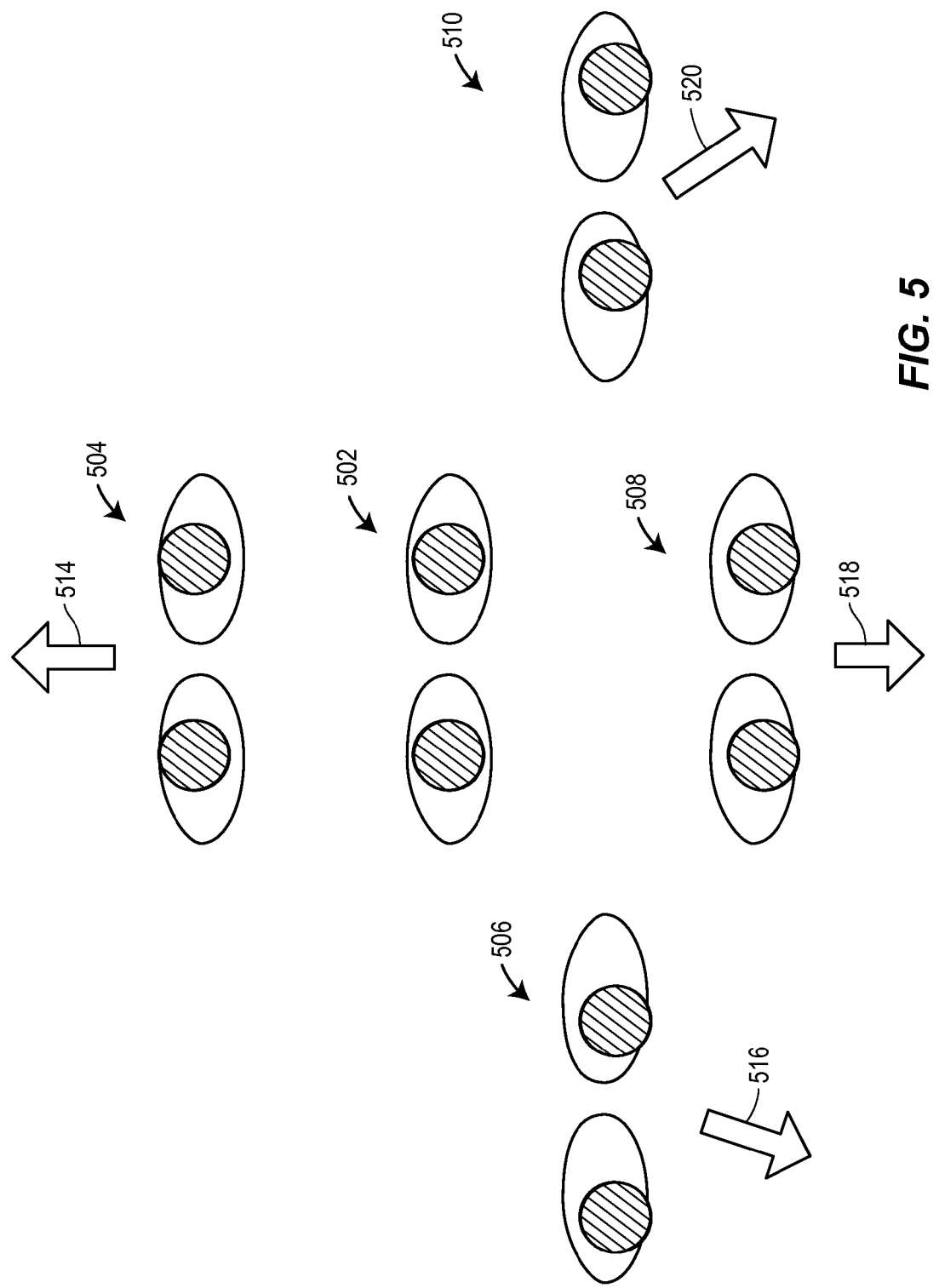
FIG. 5 illustrates example images of eyes that may be analyzed by the gaze analysis system according to an embodiment.

FIG. 5 illustrates example images of eyes that may be analyzed by the gaze analysis system 150 (shown in FIG. 1) according to an embodiment. In particular FIG. 5 illustrates example images 502-510 of eyes, and arrows 514-520 indicating gaze direction. The gaze analysis system 150 may analyze an image including eyes (e.g., any of the images 502-510) to detect a pupil and/or iris depicted in the respective image.

Detecting a pupil or iris may be advantageous because pupil position is indicative of gaze direction. In particular, pupil or iris position may be more indicative of gaze direction than a general position of the eye. For example, the gaze analysis system 150 may detect eye position and determine a head pose (e.g., head tilt upward, downward, rightward, or leftward; head rotation to a side; etc.). Head pose may correspond to a gaze of an operator. In some instances, it may be assumed that an operator is gazing straight ahead relative to the orientation of his or her head (and/or assumed that the pupil as at the eye-center), thus enabling gaze direction to be estimated without detecting a pupil or iris.

The problem with assuming a straight-ahead gaze is that operators often change gaze without changing head pose. For example, drivers often glance to the right and left while scanning the road, keeping their head in a relatively neutral, straight-forward orientation. Similarly, car drivers often glance down to adjust radio settings, check instrument readings, or operate a personal electronic device such as a phone. Without tracking the pupils of a driver, these glances typically will not be fully accounted for when determining the driver's gaze. By detecting pupil or iris positions (as well as the position of a third facial feature), however, the gaze analysis system 150 may determine a gaze direction relative to the orientation of an operator's head. Accordingly, the gaze analysis system 150 may, for example, determine that a driver is gazing away from the road even when the driver's head is oriented forward.

To better illustrate, the images 502-510 depict images of eyes for a face looking straight ahead with little head rotation or tilt. As shown by the arrows 514-520, however, each of the images 502-510 depicts a different gaze direction. For example, the gaze analysis system 150 may utilize one or more of the methods described herein to determine the pupil or iris position of the image 502 is consistent with a neutral forward-looking gaze.

As another example, the gaze analysis system 150 may utilize methods described herein to determine the pupils or irises in image 514 indicate an upward gaze 514. Similarly, the gaze analysis system 150 may determine the detected pupil or iris positions in image 506 indicate a leftward and downward gaze; that the pupil or iris positions of image 508 indicate a downward gaze; and/or that the pupil or iris positions of image 510 indicate a rightward and downward gaze.

The gaze analysis system 150 may utilize a number of image process techniques to detect pupils and/or irises. As an example, the gaze analysis system 150 may scan one of the images 502-510 to identify a segment of the respective image 502-510 corresponding to an iris or pupil. The gaze analysis system 150 may utilize any of a number of image segmentation techniques. For example, the gaze analysis system 150 may detect a cluster of pixels with similar attributes. These clusters may be detectable because the pupil typically contrasts with the iris, and the iris typically contrasts with the eye white of the eye. Accordingly, the gaze analysis system 150 may detect a cluster of pixels having a low intensity (e.g., representing a dark area) corresponding to the pupil or iris. Similarly, the gaze analysis system 150 may determine or estimate a border or edge of the cluster to identify a shape. In an embodiment, the more the shape corresponds to an elliptical shape similar to a pupil/iris, the more likely the gaze analysis system 150 is to classify the cluster as a pupil/iris. Regardless of the segmentation technique utilized, in some embodiments the gaze analysis system 150 may grayscale an image (wherein the pixels values correspond to intensity) or invert an image (wherein the brightness value of each pixel is converted to an inverse value) to improve the accuracy and/or precision of pupil or iris detection.

Figure 6:
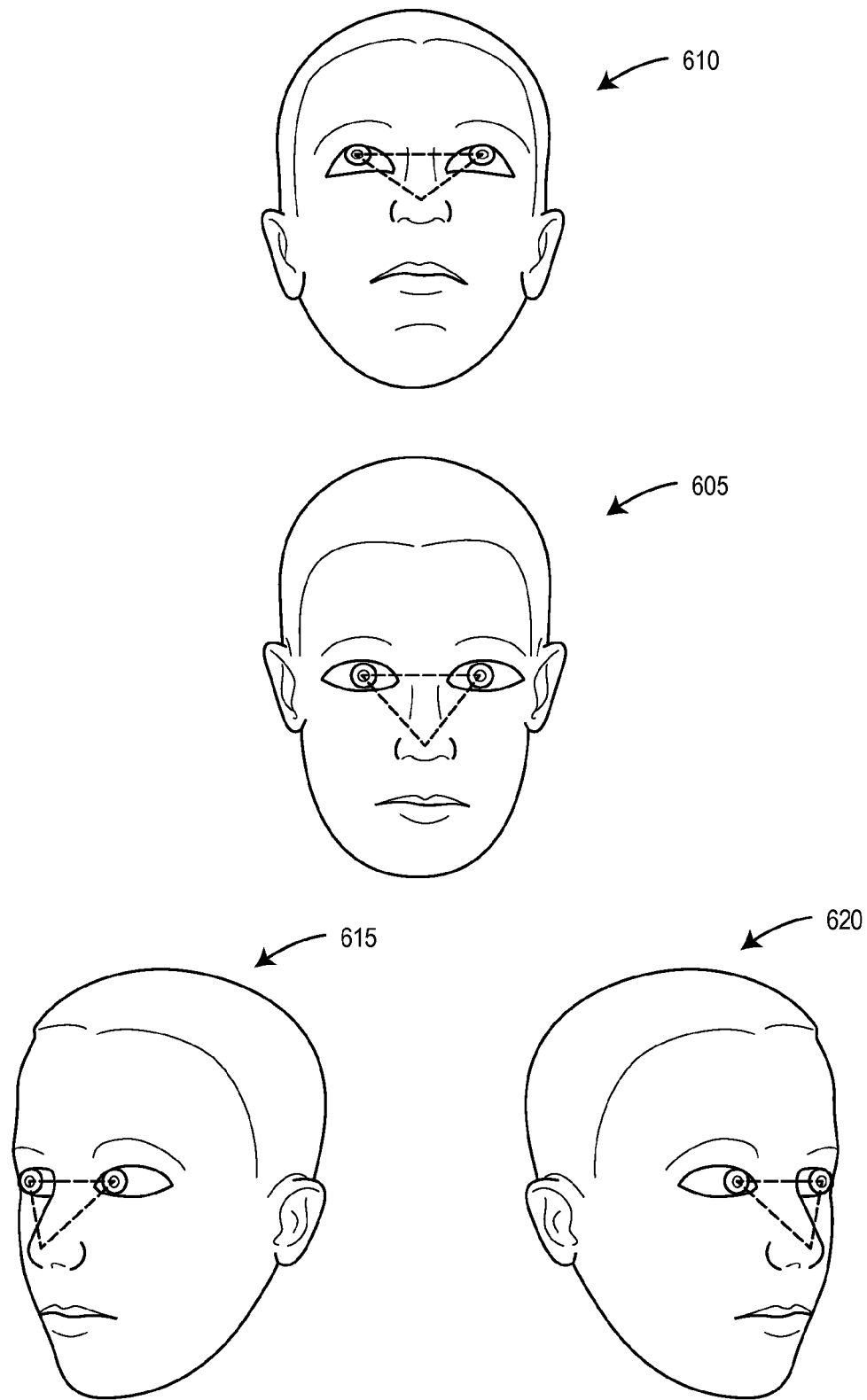
FIG. 6 illustrates example images of a face of an operator that may be analyzed by the gaze analysis system according to an embodiment.

FIG. 6 illustrates example images 605-620 of a face of an operator that may be analyzed by the gaze analysis system 150 (shown in FIG. 1) according to an embodiment. Each of the images 605-620 includes a triangle having vertices corresponding to locations of detected features (e.g., pupils and a nose). Image 605 illustrates an operator gazing forward with minimal head tilt or rotation. Image 610 illustrates an operator gazing upward. Image 615 illustrates an operator gazing to his right, while image 620 illustrates an operator gazing to his left.

The gaze analysis system 150 may determine a gaze direction for each of the images 605-620 based on the spatial characteristics of the points corresponding to the detected features. As illustrated by FIG. 6, the triangles for each of images 610, 615, and 620 represent deformations of the triangle of image 605. As discussed in detail with reference to FIG. 3, the gaze analysis system 150 may recognize these deformations to determine a gaze direction.

Figure 7A:
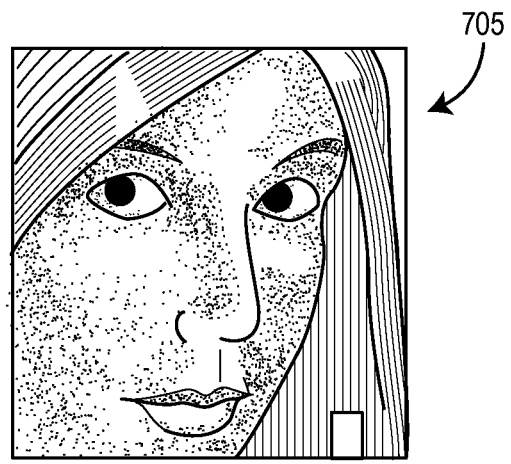
FIG. 7A-7C illustrates example images and reference patterns that may be utilized to detect facial features in accordance with the described embodiments.
Figure 7B:
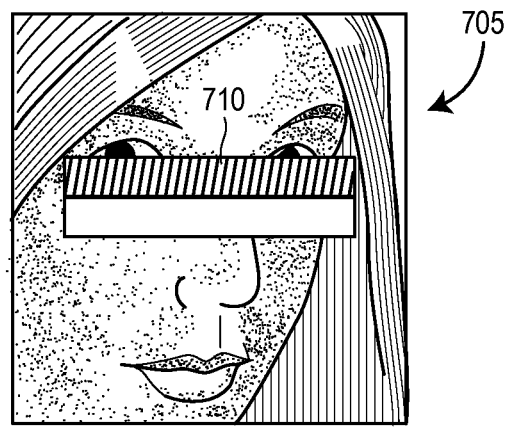
Figure 7C:
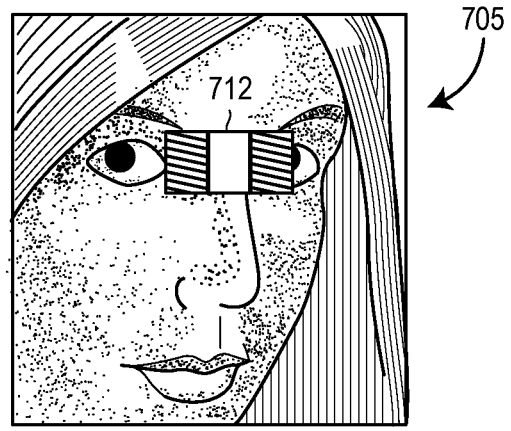

FIG. 7A-7C each illustrate an example image 705 that may be analyzed to detect facial features. FIGS. 7B and 7C depict reference patterns 710 and 712 that may be utilized by a classifier called by or included in the gaze analyzer 163 of the gaze analysis system 150 shown in FIG. 1.

Generally reference patterns are chosen so that when an area of an image including a desired facial feature of appropriate size is scanned, the image area corresponds to the reference pattern in shape, size, and/or color characteristics. For example, reference patters 710 and 712 correspond to contrast patterns typically found in images of particular facial features. For image areas depicting facial features associated with each of the reference patterns 710 and 712, a lighting pattern will correspond to the reference patterns 710 and 712.

For example, the pixels of the image 705 within the areas underneath the light regions of the reference patterns 710 and 712 are typically significantly lighter than the pixels within the areas of the image 705 underneath the dark regions of the reference patterns 710 and 712. In particular, the area on a nose bridge is often lighter than areas on either side of the nose bridge. Similarly, the area on the upper cheeks often reflects more light than the eye orbit area, which is typically recessed. Rectangular reference patterns like the reference patterns 710 and 712 are sometimes referred to as Haar features. Like the reference patterns 710 and 712, Haar feature patterns typically include at least two rectangular regions, each rectangular region being one of two types. As an example, the reference pattern 710 includes two rectangular regions: one light and one dark. By comparison, the reference pattern 712 includes three rectangular regions: one light and two dark. Classifiers and reference patterns are described in more detail with reference to FIG. 8.

Figure 8:
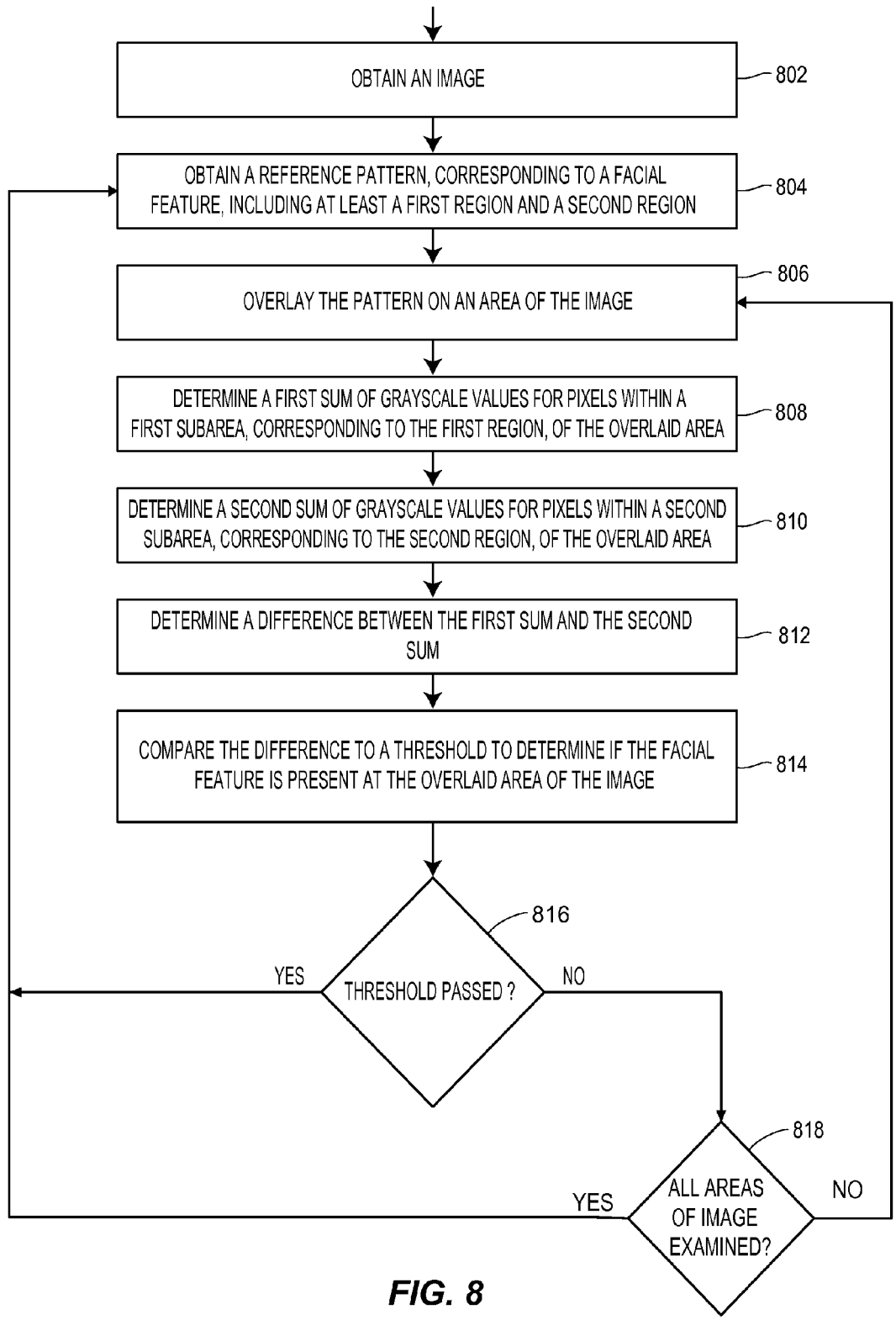
FIG. 8 illustrates an example method for facial feature detection in accordance with the described embodiments.

FIG. 8 illustrates an example method 800 for facial feature detection in accordance with the described embodiments. The method 800 may be implemented, in whole or in part, on one or more devices or systems such as the gaze analysis system 150 shown in FIG. 1. The method 800 may be saved as a set of instructions, routines, programs, or modules at a computer readable medium. In particular, the method 800 may be saved as at least part of the Gaze Analyzer routine 163 shown in FIG. 1.

The method 800 begins when the gaze analysis system 150 obtains an image (block 802) and a first reference pattern (e.g., reference pattern 710 or 712 shown in FIGS. 7A and 7B) (block 804). As noted regarding FIG. 1, a reference pattern typically corresponds to a visual feature of a desired facial feature (e.g., an eye or nose). In an embodiment, the first reference pattern includes two or more regions corresponding to areas of contrast typically found in images of the desired facial feature. In an embodiment, each region of the first reference pattern may be one of two types (e.g., corresponding to the light and dark regions of the reference patterns 710 and 712 depicted in FIGS. 7A and 7B).

To illustrate with further reference to FIGS. 7A and 7B, the reference pattern 712 includes a light region (corresponding to a nose bridge, which tends to reflect light) and two dark regions (corresponding to areas of the face on either side of the nose bridge that tend to be darker than the nose bridge). The reference pattern 712 thus includes regions of size and shape roughly approximate to lighting patterns typically found in images of nose bridges. The reference pattern(s) used in the method 800 may be chosen based on the desired facial feature. For example, nose detection will typically require a different reference pattern or set of reference patterns than would be required for detecting an eye.

The gaze analysis system 150 may scan multiple areas of an image using the first reference pattern (e.g., reference pattern 710 depicted in FIG. 7), overlaying or superimposing the first reference pattern on top of each image area.

For each image area, the gaze analysis system 150 may determine a grayscale value or intensity value of each pixel within the first region. The gaze analysis system 150 may determine a first sum of the grayscale or intensity values for pixels within the first region (block 808). A similar process may be used to determine a second sum of grayscale or intensity values for pixels within the second region (block 810). To illustrate with reference to FIG. 7, the gaze analysis system 150 may determine a first sum for the light region of reference pattern 710 and a second sum for the dark region. In a second example with reference to reference pattern 712, a first sum for the light region of reference pattern 712 may be determined and a second sum for pixels of both dark regions of reference pattern 712 may be determined.

After determining the first and second sum for the two region types, the gaze analysis system 150 may determine a difference between the first sum and the second sum (block 812). The more extreme the contrast between the image area beneath the light region(s) and the image area beneath the dark region(s), the greater the difference of sums the gaze analysis system 150 is likely to determine. For example, pixels of image 705 within the area beneath the light region of reference pattern 712 are significantly lighter than pixels of image 705 within the area beneath the dark region of reference pattern 712. Accordingly, for a scan of image 705 over the area covered by reference image 712, the first sum associated with the light regions will likely differ significantly from the second sum associated with the dark regions.

After obtaining a difference between the first and second sum, the difference may be compared to a threshold to determine whether the image area includes the desired feature (block 814). If the difference between sums exceeds a predetermined threshold, the contrast between the first and second region is sufficient to "pass" the scanned area.

Conversely, a "fail" indicates the scanned image area likely does not include the desired feature associated with the first reference pattern. The gaze analysis system 150 may "fail" an image area when the difference between sums fails to exceed the predetermined threshold. For example, if the reference pattern 712 of FIG. 7A were superimposed over a different area of the image 705, the sums for the regions of reference pattern 712 would likely differ significantly. Said another way, when an area of image 705 fails to exhibit a contrast pattern consistent with reference pattern 712, it is unlikely the area includes the nose bridge feature associated with reference pattern 712. Accordingly, the gaze analysis system 150 is unlikely to "pass" such an area.

The value of the threshold(s) utilized by the classifier of the gaze analysis system 150 may affect the pass/fail rate for a particular reference pattern. The more aggressive the threshold, the more difficult it is to obtain a hit for the reference pattern and "pass" the scanned image area. The threshold may be set and/or adjusted during a training or learning process. For example, sample images (which may include images depicting the desired feature and/or images not depicting the desired feature) may be analyzed by the gaze analysis system 150 to evaluate performance. The threshold may be raised (e.g., when too many false positives are detected) or dropped (e.g., when too many image areas depicting a desired facial feature are "failed").

The threshold associated with a reference pattern may be set more aggressively (e.g., higher) to reduce false positives and restrict "passable" image areas to those exhibiting high contrast between regions. On the other hand, the threshold may be set more conservatively (e.g., dropped) to increase "passable" image areas to encompass those exhibiting less contrast between regions (with the caveat that more false positives may "pass"). In any event, a "pass" may indicate that the scanned image area has characteristics consistent with visual features of the desired facial feature.

After "failing" an image area, the gaze analysis system 150 may continue scanning with the reference pattern if other areas of the image have not been scanned (block 818) to determine if the desired feature is present in other image areas. In some instances, the gaze analysis system 150 may continue scanning with the reference pattern after "passing" an image area.

In some embodiments, the gaze analysis system 150 obtains a new reference pattern after "passing" an image area (blocks 816 and 804). In an embodiment, subsequently used reference patterns may correspond to the same desired facial feature associated with the first reference pattern (e.g., multiple reference patterns associated with various lighting patterns often observed in images of noses may be used to detect a nose). In some instances, one or more subsequently used reference patterns may correspond to a different desired facial feature (e.g., an eye or mouth instead of a nose). In instances where multiple reference patterns are utilized to determine a single desired facial feature, each subsequently utilized reference pattern may be harder to "pass." For example, each subsequently used reference pattern may correspond to more subtle lighting patterns associated with the desired feature. Overlapping successful scans often suggests successful detection of a particular facial feature.

In some embodiments, the gaze analysis system 150 scans all or most areas of an image before obtaining a new reference pattern (block 818).

Figure 9:
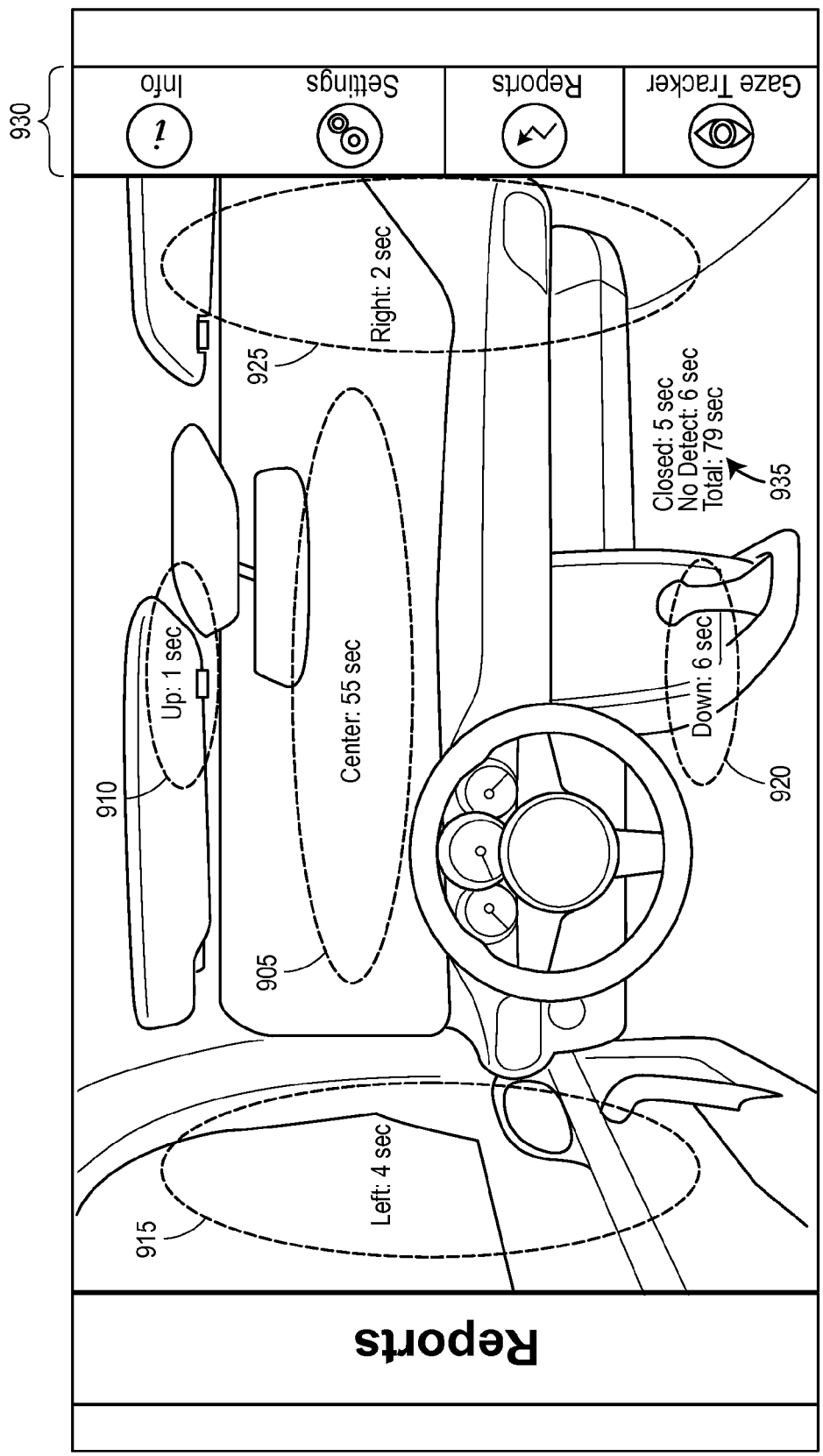
FIG. 9 illustrates an example display displaying a report in accordance with the described embodiments.

FIG. 9 illustrates an example display 900 displaying a report in accordance with the described embodiments. The display 900 may be provided via a screen communicatively connected to the gaze analysis system 150 shown in FIG. 1 For example, the screen may be part of a center console system in the vehicle 108 shown in FIG. 1. In some embodiments, the screen may be a tablet screen, a phone screen, or any other computer screen. The screen may be a touchscreen in some embodiments. In some embodiments, the display 900 is provided in near-real time (i.e., while the operator is operating the vehicle). In other embodiments, the display 900 may be provided at a later time.

The display 900 includes a control panel 930 for navigating the user interface module providing the display. The user interface module may be stored to the memory 156 of the gaze analysis system 150. In addition to displaying the display 900, in some embodiments the user interface module may enable a user to initiate and control the gaze tracking system 100.

The display 900 includes a center area 905, an upward area 910, a leftward area 915, a downward area 920, and a rightward area 925. The areas 905-925 may be referred to as a "heat map." In short, the heat map provides statistics regarding operator gaze. In the illustrated embodiment, the heat map shows how long an operator was gazing at particular areas over the course of one or more driving sessions. The display 900 also includes statistics 935 regarding a total time tracked for the operator, a total time with eyes closed, and a total time where gaze could not be determined.

In an embodiment, the display 900 may be generated based on the report data 165 stored to memory 156 (illustrated in FIG. 1). For example, the report data 165 may include one or more gaze location logs. A gaze location log may include a set of vectors corresponding to operator gaze determined from the image(s) analyzed by the gaze analysis system 150 of the gaze tracking system 100. In some embodiments, a gaze location log may track operator gaze corresponding to one or more generalized areas (e.g., upward, downward, etc.). The log may track time spent gazing at the generalized area (as shown in the display 900), or track discrete instances of gaze direction corresponding to the generalized area (e.g., for each image analyzed, the gaze location log may increment a counter for the generalized area if the operator's gaze was directed to that generalized area).

In an embodiment, the gaze location log may include values or counters to track operator gaze directed to "safe areas" (e.g., a gaze directed forward) and/or "risk areas" (e.g., a gaze directed to an area that may take the operator's attention away from the road). In such an example, when an operator's gaze is directed to a center console area (e.g., to adjust a radio or navigation unit), a gaze location log may indicate that the operator's gaze was directed to a "risk area." The gaze location log may also statistics regarding failure to detect a gaze and/or regarding closed eyes.

In an embodiment, the gaze tracking system 100 may timestamp and/or location stamp data. For example, some or all of the report data may include timestamps and/or location stamps corresponding to the time of the image capture and/or location of the vehicle when the image was captured. In an embodiment, a time duration for a gaze directed to a particular area may be determined by calculating a difference between a timestamp associated with a first gaze direction (directed to the area in question) saved to memory, and a timestamp associated with a second gaze direction (directed to an area outside of the area in question) saved to memory. For example, the first gaze direction may correspond to the time at which the operator first directed his or her attention to the area encompassed by the leftward area 915, and the second gaze direction may correspond to the time at which the operator's gaze moved outside of the area encompassed by the leftward area 915.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. For example, a system bus is described with reference to the gaze analysis system 150 shown in FIG. 1. A system bus may be any of several types of bus structures including a memory bus or memory controller, a peripheral bus, and/or a local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, and/or Peripheral Component Interconnect (PCI) bus.

In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Although this detailed description contemplates various embodiments, it should be understood that the legal scope of the invention is defined by the words of the claims set forth at the end of this patent. This detailed description is to be construed as exemplary only and does not describe every possible embodiment, as describing every possible embodiment would be impractical, if not impossible. One could implement numerous alternate embodiments, using either current technology or technology developed after the filing date of this patent, which may fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims of this patent is referred to in this patent in a manner consistent with a single meaning, that is done for sake of clarity only so as to not confuse the reader, and it is not intended that such claim term be limited, by implication or otherwise, to that single meaning.

What is claimed is:

1. A gaze tracking system, the gaze tracking system comprising:
    an image sensor device positioned on or within a vehicle such that the image sensor device may capture an image of an operator interface area in the vehicle;
    one or more processors communicatively coupled to the image sensor device; and
    one or more memory devices, communicatively coupled to the one or more processors, including instructions that when executed cause the one or more processors to (i) perform a calibration and (ii) perform gaze tracking;
    the instructions to perform a calibration including instructions that when executed cause the one or more processors to:
        (a) transmit a signal to cause the image sensor device to capture a first image of an operator interface area in the vehicle,
        (b) receive the first image from the image sensor device,
        (c) detect in the first image three facial features of a person, the three facial features including two-eye pupils,
        (d) identify a first triangle including vertices positioned according to locations of the three facial features in the first image, and
        (e) associate the first triangle with a first gaze direction;
    the instructions to perform gaze tracking including instructions that when executed cause the one or more processors to:
        (a) transmit a signal to cause the image sensor device to capture a second image of an operator interface area in the vehicle,
        (b) receive the second image from the image sensor device,
        (c) detect the three facial features in the second image,
        (d) identify a second triangle including vertices positioned according to locations of the three facial features in the second image,
        (e) determine a transformation from the first triangle to the second triangle,
        (f) determine a second gaze direction based, at least in part, on the determined transformation from the first triangle to the second triangle by identifying a surface normal for the second triangle, wherein a change from the first gaze direction to the second gaze direction can be tracked regardless of whether the person's head pose changed from the first image to the second image, and (g) store, at the one or more memory devices, report data including data representing the second gaze direction.

2. The gaze tracking system of claim 1, further including a speaker or display.

3. The gaze tracking system of claim 1, wherein the image sensor device is embedded in a dash or console of the vehicle.

4. The gaze tracking system of claim 2, wherein the instructions to perform a calibration further include instructions to:
cause the one or more processors to provide, via the speaker or display, directions to a vehicle operator to (i) assume a particular head pose, or (ii) gaze in a particular direction.

5. The gaze tracking system of claim 2, wherein the one or more memory devices further include instructions to:
cause the one or more processors to provide, via the speaker or display, a report based at least in part on the report data stored at the one or more memory devices;
wherein the report includes statistics regarding time spent gazing in the direction of one or more areas.

6. The gaze tracking system of claim 5, wherein the report is provided in near real-time as a vehicle operator operators the vehicle.

7. The gaze tracking system of claim 2, wherein the one or more memory devices further include instructions to cause the one or more processors to provide, via the speaker or display, an alarm when the second gaze direction is outside of a predefined range of safe gaze directions.

8. The gaze tracking system of claim 1, wherein the image sensor device is configured to capture a stream of images at a rate of at least ten images per second, and
wherein the instructions to perform gaze tracking further include instructions to cause the one or more processors to perform gaze tracking in near real-time, wherein a gaze direction is determined for each of at least ten images every second.

9. The gaze tracking system of claim 1, wherein the instructions to perform calibration further include instructions to cause the one or more processors to perform calibration automatically while the vehicle operator operates the vehicle.

10. The gaze tracking system of claim 1, wherein the one or more processors and the one or more memory devices are part of an on-board system for the vehicle.

11. The gaze tracking system of claim 10, further including a display embedded in a dash or console of the vehicle, wherein the one or more memory devices further include instructions to provide a report via the embedded display.

12. The gaze tracking system of claim 1, wherein the one or more processors are communicatively coupled to the image sensor device via at least one wireless link.

13. The gaze tracking system of claim 12, wherein the one or more processors and the one or more memory devices are part of a mobile device.

14. The gaze tracking system of claim 12, wherein the one or more processors and the one or more memory devices are part of a stationary server system.

15. A computer-implemented method for operating a gaze tracking system, the method comprising:
causing one or more processors of a gaze tracking system to perform a calibration, wherein causing one or more processors of the gaze tracking system to perform the calibration includes causing one or more processors to:
receive a first image of an operator interface area within the vehicle,
detect in the first image three facial features of a person, the three facial features including two eye pupils,
identify a first triangle including vertices positioned according to locations of the three facial features in the first image, and
associate the first triangle with a first gaze direction; and
causing one or more processors of the gaze tracking system to perform gaze tracking, wherein causing one or more processors of the gaze tracking system to perform gaze tracking includes causing one or more processors of the gaze tracking system to:
receive a second image of the operator interface area within the vehicle,
detect the three facial features in the second image,
identify a second triangle including vertices positioned according to locations of the three facial features in the second image,
determine a transformation from the first triangle to the second triangle,
determine a second gaze direction based, at least in part, on the determined transformation from the first triangle to the second triangle by identifying a surface normal for the second triangle, wherein a change from the first gaze direction to the second gaze direction can be tracked between regardless of whether the person's head pose changed from the first image to the second image, and
store, at one or more memory devices, report data including data representing the second gaze direction.

16. The computer-implemented method of claim 15, further comprising:
causing one or more processors of the gaze tracking system to receive a series of images of the operator interface area within the vehicle;
causing one or more processors of the gaze tracking system to detect the three facial features in each of the series of images;
causing one or more processors of the gaze tracking system to identify a triangle for each of the series of images, each triangle including vertices positioned according to locations of the three facial features detected in the corresponding image;
for each triangle, causing one or more processors of the gaze tracking system to determine a transformation relative to the first triangle;
for each determined transformation, causing one or more processors of the gaze tracking system to determine a gaze direction based, at least in part, on the corresponding determined transformation; and
for each determined gaze direction, causing one or more processors of the gaze tracking system to store, at the one or more memory devices, report data including data representing each determined gaze direction;
the report data identifying an operator gaze distribution for the series of images.

17. The computer implement method of claim 16, wherein a report is provided, based on the report data, at a display while the operator is operating the vehicle, and wherein the report data is updated for subsequently determined gaze directions associated with subsequently received images.

18. The computer implemented method of claim 16, wherein the report data identifies at least one area and a period of time, the period of time indicating an amount of time an operator was gazing in the direction of the one area.

19. The computer implemented method of claim 16, further comprising:
- causing one or more processors to determine a plurality of positions for a first of the thre facial features, the plurality of positions including a first position for the first image, a second position for the second image, and a third position for a third image from the series of images;
- causing one or more processors to determine a movement pattern, the movement pattern determined from the plurality of positions for the first of the three facial features; and
- causing one or more processors to estimate a fourth position for the first of three facial features based, at least in part, on the determined movement pattern.

20. The computer implemented method of claim 15, wherein the third facial feature is a nose.

21. The computer implemented method of claim 15, wherein the transformation from the first triangle to the second triangle is a homography or an affine transformation.

22. The computer implemented method of claim 15, further comprising causing one or more processors to determine, based at least in part on the determined transformation, a head pose for the operator.

* * * * *